United States Patent
Yasaki et al.

(10) Patent No.: US 10,291,621 B2
(45) Date of Patent: May 14, 2019

(54) SYSTEM, INFORMATION PROCESSING APPARATUS, AND STORAGE MEDIUM

(71) Applicant: FUJITSU LIMITED, Kawasaki-shi, Kanagawa (JP)

(72) Inventors: Koichi Yasaki, Kawasaki (JP); Kazuaki Nimura, Kawasaki (JP); Hidenobu Ito, Kawasaki (JP); Takuya Sakamoto, Kawasaki (JP); Yosuke Nakamura, Kawasaki (JP); Junya Kani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 15/445,111

(22) Filed: Feb. 28, 2017

(65) Prior Publication Data

US 2017/0264615 A1 Sep. 14, 2017

(30) Foreign Application Priority Data

Mar. 8, 2016 (JP) ................. 2016-044240

(51) Int. Cl.
*H04W 4/00* (2018.01)
*H04L 29/06* (2006.01)
(Continued)

(52) U.S. Cl.
CPC ........ *H04L 63/101* (2013.01); *H04L 41/0803* (2013.01); *H04L 63/0428* (2013.01);
(Continued)

(58) Field of Classification Search
CPC ............... H04L 63/101; H04L 41/0803; H04L 63/0428; H04L 63/08; H04L 63/104;
(Continued)

(56) References Cited

U.S. PATENT DOCUMENTS 9,451,462 B2 * 9/2016 Kim .................... H04L 63/0876
9,749,865 B2 * 8/2017 Moon .................... H04W 76/38
(Continued)

FOREIGN PATENT DOCUMENTS

JP 2013-123234 6/2013
WO WO 2015/049825 A1 4/2015

OTHER PUBLICATIONS

Extended European Search Report dated Jul. 18, 2017 from European Patent Application No. 17158473.3, 8 pages.

*Primary Examiner* — Joseph P Hirl
*Assistant Examiner* — Stephen T Gundry
(74) *Attorney, Agent, or Firm* — Staas & Halsey LLP

(57) ABSTRACT

A system includes an apparatus among apparatuses configured to relay communication between equipment, and another apparatus coupled to the apparatuses through a network. The apparatus receives a beacon from one or more equipment for which given operation is executed by a user among a plurality of equipment, the beacon including first identifier whose value is common to the plurality of equipment, each of the plurality of equipment being configured to transmit the beacon; transmits the first identifier and second identifier identifying the one or more equipment, in the beacon, to the another apparatus; and executes relaying communication between equipment relating to a list of second identifier from the another apparatus. The another apparatus transmits, to one of apparatuses, a list of second identifier received in relation to first identifier with a common value in a plurality of the first identifier received from the one of apparatuses.

6 Claims, 18 Drawing Sheets

(1)

(2)

(51) Int. Cl.
*H04W 12/08* (2009.01)
*H04L 12/24* (2006.01)
*H04W 4/70* (2018.01)

(52) U.S. Cl.
CPC ............ *H04L 63/08* (2013.01); *H04L 63/104* (2013.01); *H04L 63/1441* (2013.01); *H04W 12/08* (2013.01); *H04W 4/00* (2013.01); *H04W 4/70* (2018.02)

(58) Field of Classification Search
CPC .... H04L 63/1441; H04W 12/08; H04W 4/70; H04W 4/00
See application file for complete search history.

(56) References Cited

U.S. PATENT DOCUMENTS

| | | | | |
|---|---|---|---|---|
| 9,918,351 | B2* | 3/2018 | Kim | H04W 4/70 |
| 2005/0259620 | A1* | 11/2005 | Igarashi | H04L 41/00 370/331 |
| 2006/0111097 | A1* | 5/2006 | Fujii | H04L 63/08 455/420 |
| 2009/0245176 | A1 | 10/2009 | Balasubramanian et al. | |
| 2012/0030351 | A1* | 2/2012 | Fukushima | H04L 63/101 709/224 |
| 2012/0093316 | A1* | 4/2012 | Ishidoshiro | H04L 63/06 380/270 |
| 2012/0178421 | A1* | 7/2012 | Fujii | H04L 63/08 455/411 |
| 2013/0036170 | A1* | 2/2013 | Hori | G06F 3/1204 709/204 |
| 2013/0057897 | A1* | 3/2013 | Park | G06F 21/608 358/1.14 |
| 2013/0290701 | A1* | 10/2013 | Takenaka | H04L 9/0833 713/153 |
| 2014/0045466 | A1* | 2/2014 | Naito | H04W 4/70 455/411 |
| 2014/0101727 | A1* | 4/2014 | Okuyama | H04L 63/20 726/4 |
| 2014/0207932 | A1* | 7/2014 | Hyo | H04L 67/1097 709/223 |
| 2015/0271676 | A1* | 9/2015 | Shin | H04W 12/08 713/168 |
| 2015/0350820 | A1* | 12/2015 | Son | H04W 12/08 455/41.2 |
| 2015/0358792 | A1* | 12/2015 | Hashimoto | H04W 4/21 370/329 |
| 2016/0072975 | A1* | 3/2016 | Fujioka | H04N 1/00854 358/1.14 |
| 2016/0087959 | A1* | 3/2016 | Park | H04W 12/06 713/171 |
| 2016/0087982 | A1* | 3/2016 | Takano | H04L 63/0876 726/3 |
| 2016/0173496 | A1* | 6/2016 | Saka | G06F 21/44 726/4 |
| 2016/0224291 | A1* | 8/2016 | Ishino | G06F 3/1238 |
| 2016/0241535 | A1 | 8/2016 | Kadomatsu | |
| 2016/0269989 | A1* | 9/2016 | Komine | H04L 63/0876 |
| 2016/0286591 | A1* | 9/2016 | Yasaki | H04W 4/70 |
| 2016/0309330 | A1* | 10/2016 | Moon | H04W 76/38 |
| 2017/0013397 | A1* | 1/2017 | Itoh | H04W 4/80 |
| 2017/0094079 | A1* | 3/2017 | Watanabe | H04N 1/00204 |
| 2017/0094706 | A1* | 3/2017 | Kim | H04W 4/70 |
| 2017/0156076 | A1* | 6/2017 | Eom | H04W 4/70 |
| 2017/0164414 | A1* | 6/2017 | Cho | H04L 61/2015 |
| 2017/0231022 | A1* | 8/2017 | Ito | H04W 12/04 |
| 2017/0257748 | A1* | 9/2017 | Takata | H04W 4/029 |
| 2018/0047232 | A1* | 2/2018 | Sakumoto | G07C 9/00309 |
| 2018/0091365 | A1* | 3/2018 | Nakajima | H04W 4/08 |
| 2018/0212765 | A1* | 7/2018 | Yamazaki | G06F 21/60 |

* cited by examiner

FIG. 6

| API1 | API2 | API3 | ... |
|------|------|------|-----|
| ○ | × | ○ | ... |

FIG. 11

| GROUP ID | DEVICE ID |
|---|---|
| WE98OQW | 22:44:66:88:00:22 |
|  | 55:66:77:88:99:00 |
|  | XXX APPLICATION |
|  | <IP ADDRESS> : 33:44:55:66:77 |
| : | : |

FIG. 15

| GROUP ID | IP ADDRESS OF GATEWAY | DEVICE ID | MASTER FLAG | ... |
|---|---|---|---|---|
| ... | ... | ... | ... | ... |
| ... | ... | ... | ... | ... |
| ⋮ | ⋮ | ⋮ | ⋮ | ⋮ |

32

SYSTEM, INFORMATION PROCESSING APPARATUS, AND STORAGE MEDIUM

CROSS-REFERENCE TO RELATED APPLICATION

This application is based upon and claims the benefit of priority of the prior Japanese Patent Application No. 2016-044240, filed on Mar. 8, 2016, the entire contents of which are incorporated herein by reference.

FIELD

The present embodiments are related to a system, an information processing apparatus, and a storage medium.

BACKGROUND

In recent years, machine to machine (M2M) and internet of things (IoT), in which things (devices) communicate with each other, have been realized. For example, it is conceivable that Bluetooth (registered trademark) earphone microphones are wirelessly coupled to each other and a conversation is made in a ride, and it is conceivable that a projector is wirelessly coupled to a pointer with a built-in secure digital (SD) card and a presentation is made by using a presentation material stored in the SD card of the pointer.

The devices such as the Bluetooth (registered trademark) earphone microphone, the projector, and the pointer with a built-in SD card have poor communication performance and low battery capacity. Therefore, for wireless coupling between these devices, it is practical to arbitrate communications between the devices by a gateway.

FIG. 1 illustrates an example of coupling between devices with an intermediary of a gateway. (1) of FIG. 1 illustrates an example in which the respective devices are coupled to different gateways. In this case, the gateways communicate with each other through the Internet or the like, for example, and thereby communications between the devices are implemented.

(2) of FIG. 1 illustrates an example in which the respective devices are coupled to the same gateway. In this case, communications between the devices are implemented through this gateway.

For example, a smartphone or the like is used as the gateway.

In the case of implementing communications like those illustrated in FIG. 1, it is preferable to make setting relating to security on the gateway in order to defend against an attack on the wirelessly-coupled device and protect information stored in this device.

For example, a whitelist is set in the gateway in order to limit access to an application program interface (API) of a management system of each device, access to data other than specific data, and so forth. In order to alleviate the burden of such setting work, for example, it is conceivable that the storage area of the whitelist is decided on each device basis and the gateway reads the whitelist from the storage area corresponding to a found device.

As an example of related art, Japanese Laid-open Patent Publication No. 2013-123234 and International Publication Pamphlet No. WO 2015/049825

SUMMARY

According to an aspect of the invention, a system includes a first information processing apparatus in one or more first information processing apparatuses configured to relay communication between equipment, the first information processing apparatus including a communication device and first processor; and a second information processing apparatus coupled to the one or more first information processing apparatuses through a network, the second information processing apparatus including a communication device and second processor. The first processor of the first processing apparatus is configured to: receive a beacon from one or more equipment for which given operation is executed by a user among a plurality of equipment, the beacon including first identification information whose value is common to the plurality of equipment, each of the plurality of equipment being configured to transmit the beacon, transmit the first identification information and second identification information identifying the one or more equipment, included in the received beacon, to the second information processing apparatus, and execute processing of relaying communication between equipment relating to a list of second identification information transmitted from the second information processing apparatus. The second processor of the second processing apparatus is configured to: transmit, to one of one or more first information processing apparatuses or a plurality of first information processing apparatus in the one or more first information processing apparatuses, a list of second identification information received in relation to first identification information with a common value in a plurality of the first identification information received from the one of one or more first information processing apparatuses or the plurality of the first identification information received from the plurality of first information processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates a configuration example of a whitelist;

FIG. 11 illustrates a configuration example of a group information storing unit;

FIG. 15 illustrates a configuration example of a history storing unit;

DESCRIPTION OF EMBODIMENTS

In the related art, the gateway reads out the whitelists of all found devices. Therefore, the gateway also reads the whitelist of a device that is not a coupling target and constructs a whitelist network. For example, in the case of desiring to mutually couple only a projector and a pointer with a built-in SD card, when another device capable of wireless communications exists near the gateway, a whitelist network including even this another device is constructed.

In this case, the safety of the network deteriorates compared with the case in which the constituent elements of the network are limited to the projector and the pointer with a built-in SD card. Thus, the user executes work for decoupling this another device from the network.

Therefore, in one aspect, the present invention intends to simplify setting work for limiting pieces of equipment capable of mutual communications.

Figure 2:
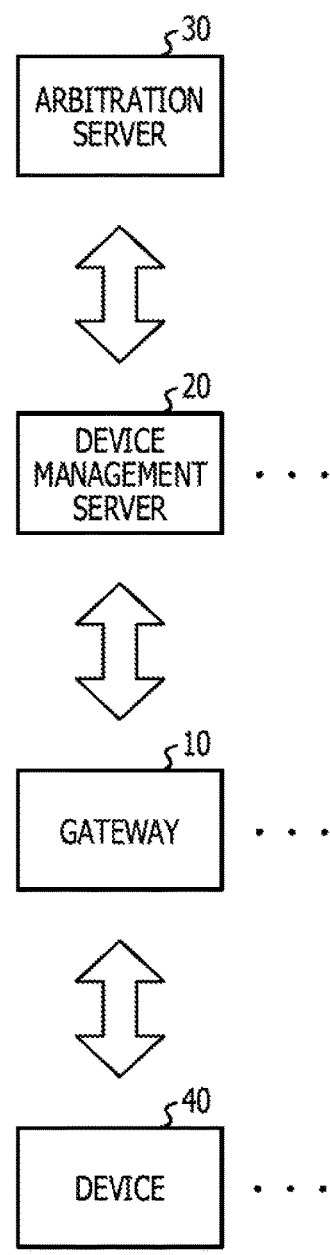
FIG. 2 illustrates a configuration example of a device cooperation system in an embodiment.

An embodiment will be described below based on the drawings. FIG. 2 illustrates a configuration example of a device cooperation system in the embodiment. In FIG. 2, a device cooperation system 1 includes two or more devices 40, one or more gateways 10, one or more device management servers 20, and an arbitration server 30.

The device 40 is equipment having a wireless communication function. In the present embodiment, each device 40 communicates with another device 40 through wireless communications with the gateway 10.

The gateway 10 is apparatus that may relay communications between the devices 40. For example, a smartphone may be used as the gateway 10. Alternatively, dedicated equipment may be used as the gateway 10. The gateway 10 may communicate with the device management server 20 through wireless communications.

The device management server 20 is one or more computers prepared by the vendor of the device 40, for example. The device management server 20 manages information relating to the device 40. Each device management server 20 is coupled to the arbitration server 30 with an intermediary of a network such as a local area network (LAN) or the Internet. It is to be noted that functions (services) of the device management server 20 may be provided as cloud services.

The arbitration server 30 determines the group of the devices 40 intended by a user. The group of the devices 40 intended by a user is a collection of the devices 40 selected as cooperation targets by the user. The cooperation refers to the state in which wireless communications may be mutually executed.

Figure 3:
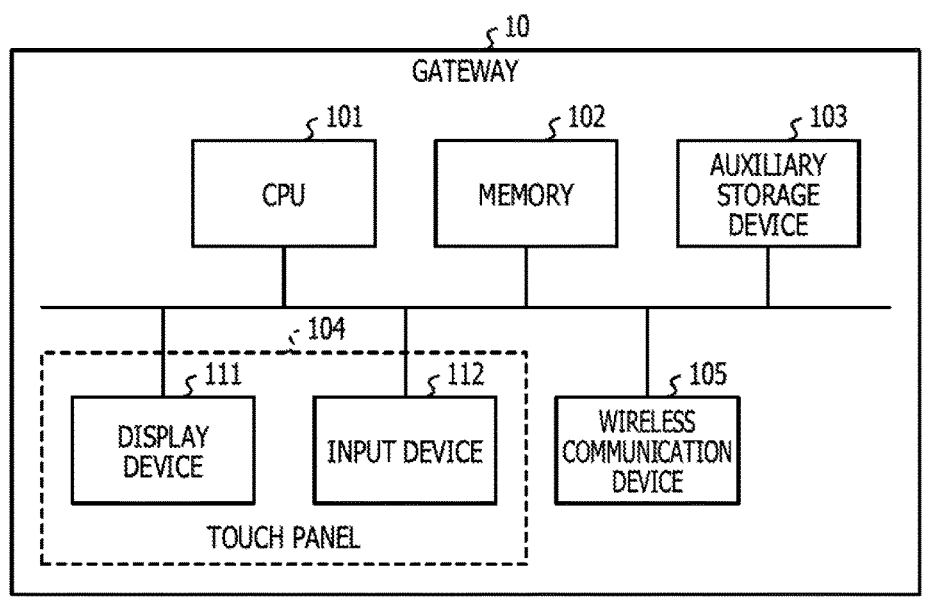
FIG. 3 illustrates a hardware configuration example of a gateway in an embodiment.

FIG. 3 illustrates a hardware configuration example of the gateway in the embodiment. In FIG. 3, the gateway 10 includes a central processing unit (CPU) 101, a memory 102, auxiliary storage device 103, a touch panel 104, wireless communication device 105, and so forth.

The auxiliary storage device 103 stores a program installed on the gateway 10 and so forth. The memory 102 reads out a program from the auxiliary storage device 103 and stores the program if an instruction to activate the program is made. The CPU 101 implements functions relating to the gateway 10 in accordance with the program stored in the memory 102.

The touch panel 104 is an electronic part having both an input function and a display function and executes displaying of information, acceptance of input from a user, and so forth. The touch panel 104 includes display device 111, input device 112, and so forth.

The display device 111 is a liquid crystal display or the like and is in charge of the display function of the touch panel 104. The input device 112 is an electronic part including a sensor that detects the contact of a contact object with the display device 111. The detection system of the contact of a contact object may be any of publicly-known systems such as a capacitive system, a resistive film system, or an optical system. It is to be noted that the contact object refers to an object that gets contact with a contact surface (surface) of the touch panel 104. As one example of such an object, a finger of a user, a dedicated or general pen, and so forth are cited.

The wireless communication device 105 is an electronic part for wireless communications.

Figure 4:
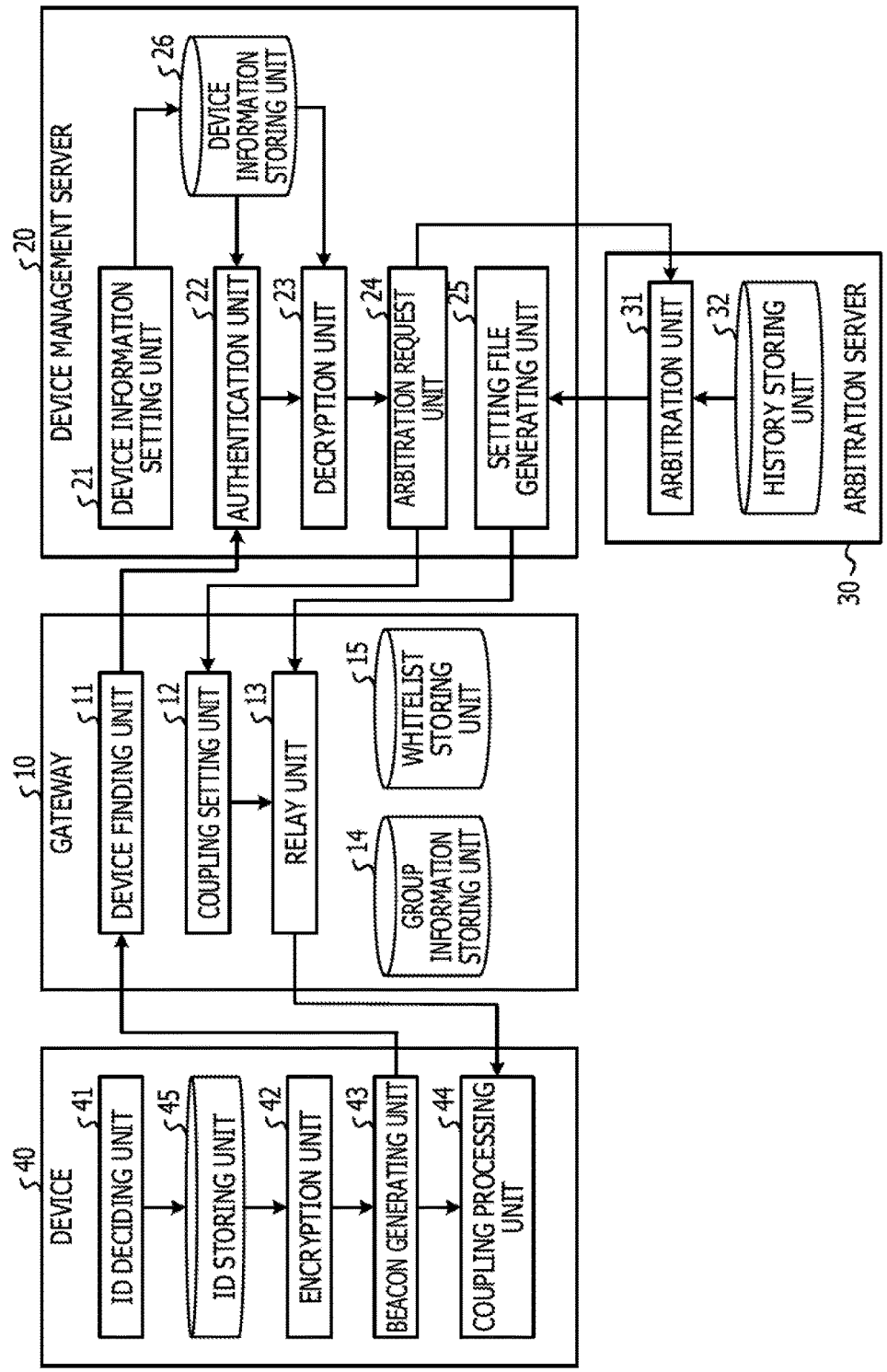
FIG. 4 illustrates a functional configuration example of a device cooperation system in an embodiment.

FIG. 4 illustrates a functional configuration example of the device cooperation system in the embodiment. In FIG. 4, the device 40 includes an identification (ID) deciding unit 41, an encryption unit 42, a beacon generating unit 43, a coupling processing unit 44, and so forth. These respective units are implemented through execution of one or more programs installed on the device 40 by a CPU of the device 40. The device 40 includes an ID storing unit 45. The ID storing unit 45 is implemented by a memory the device 40 includes, or the like.

The ID deciding unit 41 generates candidates for a group ID that is common identification information between the devices 40 specified as cooperation targets by a user. The ID deciding unit 41 decides, as the group ID, one candidate among the candidates for the group ID generated by the ID deciding unit 41 of each device 40. The ID storing unit 45 stores the candidates for the group ID generated by the ID deciding unit 41.

The encryption unit 42 encrypts the group ID and so forth. The beacon generating unit 43 generates a beacon including the encrypted group ID and so forth and transmits this beacon.

The coupling processing unit 44 executes coupling processing of wireless communications with the gateway 10.

The gateway 10 includes a device finding unit 11, a coupling setting unit 12, a relay unit 13, and so forth. These respective units are implemented through execution of one or more programs installed on the gateway 10 by the CPU 101. Furthermore, the gateway 10 uses a group information storing unit 14 and a whitelist storing unit 15. These respective storing units are implemented by the memory 102 or the auxiliary storage device 103 or the like, for example.

The device finding unit 11 detects the existence of the device 40 by receiving the beacon that is being transmitted by the device 40. The device finding unit 11 transmits a device ID, an encrypted group ID, and so forth included in the received beacon to the device management server 20. The device ID is information with which the device 40 may be uniquely identified, such as a media access control (MAC) address or a universally unique identifier (UUID).

The coupling setting unit 12 receives a setting file returned from the device management server 20 in response to the transmission of the encrypted group ID and so forth. The setting file is a file including a list of device IDs corresponding to the group of the devices 40 permitted to cooperate, the group ID for this group, information for coupling of wireless communications with the device 40, a whitelist of each device 40 that belongs to this group, and so forth. The whitelist is information indicating whether or not access from other devices 40 is permitted regarding each interface (API) the device 40 includes. The coupling setting unit 12 stores the list of device IDs included in the setting file in the group information storing unit 14 and stores the whitelists included in the setting file in the whitelist storing unit 15.

The relay unit 13 executes communications with the device 40 based on the setting file and controls a relay of communications between the devices 40 with reference to the group information storing unit 14 and the whitelist storing unit 15.

The device management server 20 includes a device information setting unit 21, an authentication unit 22, a decryption unit 23, an arbitration request unit 24, a setting file generating unit 25, and so forth. These respective units are implemented through execution of one or more programs installed on the device management server 20 by a CPU of the device management server 20. The device management server 20 uses a device information storing unit 26. The device information storing unit 26 is implemented by auxiliary storage device the device management server 20 includes or storing apparatus that may be coupled to the device management server 20 through a network, or the like.

The device information setting unit 21 accepts setting of information relating to the relevant device 40 regarding each device 40. For example, the device information setting unit 21 accepts setting of a common key used for encryption of a group ID, the ID of the gateway 10 that permits coupling with the relevant device 40 (hereinafter, referred to as "gateway ID"), the whitelist of the relevant device 40, and so forth. The device information setting unit 21 stores the set information in the device information storing unit 26.

The authentication unit 22 executes authentication about the gateway 10 that accesses the device management server 20. The decryption unit 23 decrypts an encrypted group ID and so forth transmitted from the gateway 10. The arbitration request unit 24 transmits the decrypted group ID, the device ID received together with the group ID, and so forth to the arbitration server 30. The arbitration request unit 24 receives a list of device IDs determined to form a group by the arbitration server 30, and so forth, from the arbitration server 30.

The setting file generating unit 25 generates the setting file including the list of device IDs received by the arbitration request unit 24, information stored in the device information storing unit 26 regarding each device ID included in this list, and so forth. The setting file generating unit 25 transmits the generated setting file to the gateway 10.

The arbitration server 30 includes an arbitration unit 31. The arbitration unit 31 is implemented through execution of one or more programs installed on the arbitration server 30 by a CPU of the arbitration server 30. The arbitration server 30 uses a history storing unit 32. For example, the history storing unit 32 is implemented by auxiliary storage device the arbitration server 30 includes or storing apparatus that may be coupled to the arbitration server 30 through a network, or the like.

The arbitration unit 31 receives a group ID, a device ID, and so forth transmitted from the device management server 20 every time the device 40 is found by the gateway 10 and generates a list of device IDs corresponding to a common group ID. The arbitration unit 31 transmits the generated list of device IDs to the device management server 20. The history storing unit 32 stores the group ID, the device ID, and so forth transmitted from the device management server 20 every time the device 40 is found by the gateway 10.

Figure 5:
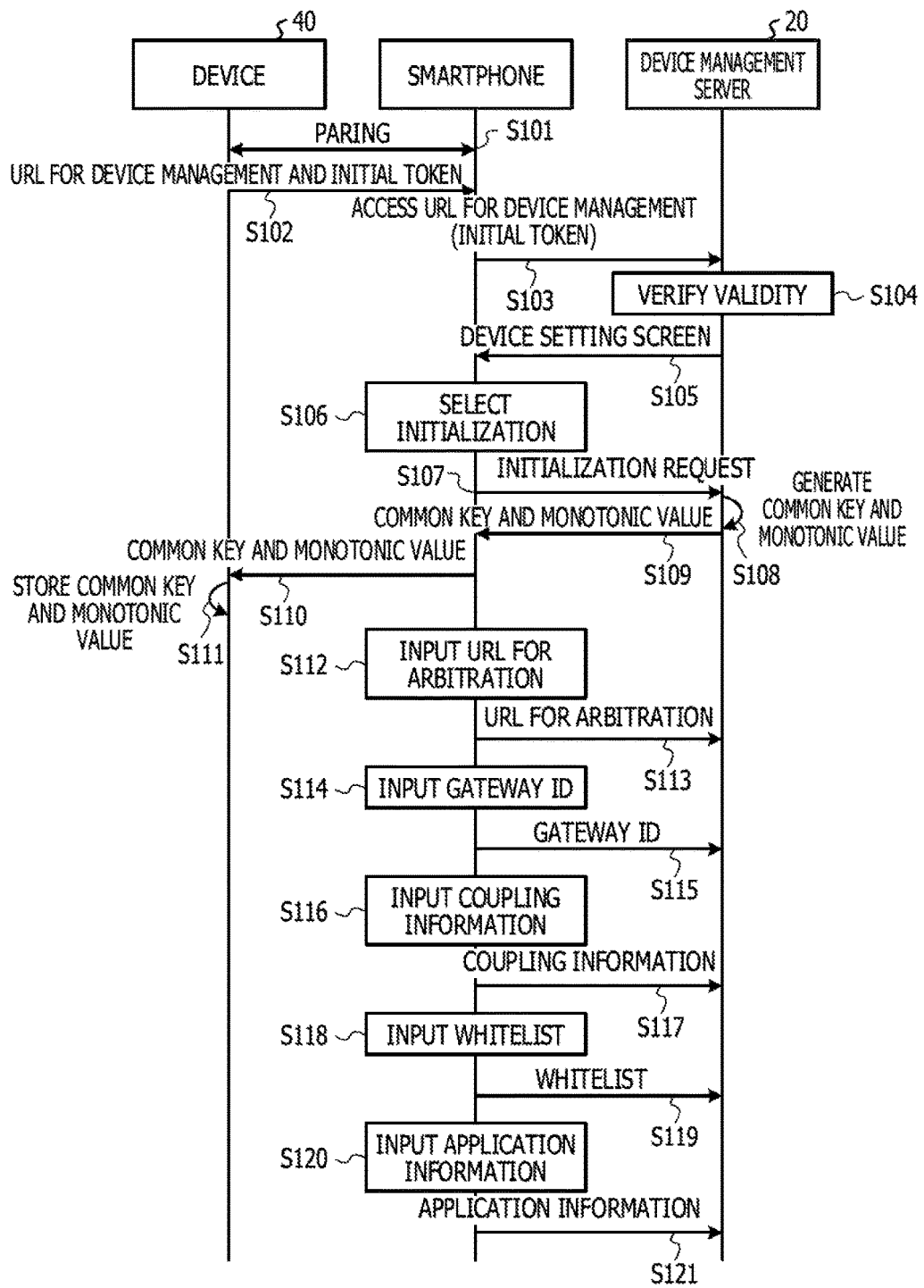
FIG. 5 is a sequence diagram for explaining an outline of an overall processing procedure.

A processing procedure executed in the device cooperation system 1 will be described below. FIG. 5 is a sequence diagram for explaining an outline of a processing procedure of initial setting processing. The initial setting processing refers to setting processing executed in advance when the present embodiment is executed. It is to be noted that a smartphone in FIG. 5 does not necessarily need to be a smartphone used as the gateway 10.

In a step S101, the smartphone executes paring with the device 40 desired to cooperate with another device 40. The paring is executed in accordance with a general procedure such as input of a personal identification number (PIN) code. Communications between the smartphone and the device 40 are enabled by the paring.

Subsequently, the smartphone acquires a uniform resource locator (URL) for device management and an initial token from the device 40 (S102). The URL for device management is a URL to the device management server 20 corresponding to this device 40. Furthermore, the initial token is data indicating the validity of the device 40. In the present embodiment, data obtained by encrypting a device ID is exemplified as the initial token. It is to be noted that the URL for device management and the initial token are recorded in the device 40 by the vendor of the device 40 before shipment of the device 40, for example.

Subsequently, the smartphone transmits the initial token to the URL for device management (S103). This initial token is received by the device information setting unit 21 of the device management server 20 relating to this URL for device management. Next, the device information setting unit 21 verifies the validity of this initial token (S104). For example, the device information setting unit 21 decrypts this initial token by using a cryptographic key stored in the device management server 20 in advance and determines whether or not the decryption result corresponds with any device ID stored in the device information storing unit 26 in advance. If the decryption result corresponds with none of the device IDs stored in the device information storing unit 26 in advance, the subsequent processing is ceased. On the other hand, if the decryption result corresponds with any device ID stored in the device information storing unit 26 in advance, the device information setting unit 21 returns a device setting screen to the smartphone (S105). When receiving the device setting screen, the smartphone displays this device setting screen. It is to be noted that, hereinafter, the device ID indicated by the decryption result will be referred to as the "subject device ID."

Subsequently, when initialization is instructed to the device setting screen by the user (S106), the smartphone transmits an initialization request to the device management server 20 relating to the URL for device management (S107). In response to the initialization request, the device information setting unit 21 of the device management server 20 generates a common key for each device 40 and a monotonic value (S108). The generated common key and the monotonic value are associated with the subject device ID and are stored in the device information storing unit 26. It is to be noted that the monotonic value is a value that monotonically increases at a given timing to be described later. In the step S108, a value as the start point of the monotonic increase is generated. Subsequently, the device information setting unit 21 transmits the generated common key and monotonic value to the smartphone (S109).

When receiving the common key and the monotonic value, the smartphone transmits these common key and monotonic value to the device 40 (S110). The device 40 stores these common key and monotonic value from the smartphone (S111).

Next, when a URL for arbitration is input to the device setting screen by the user (S112), the smartphone transmits this URL for arbitration to the device management server 20 relating to the URL for device management (S113). The URL for arbitration is a URL to the arbitration server 30. The device information setting unit 21 of the device management server 20 stores this URL for arbitration in the device information storing unit 26 in association with the subject device ID.

Subsequently, when identification information (hereinafter, referred to as "gateway ID") of each of one or more gateways 10 on which the device 40 may rely is input to the device setting screen by the user (S114), the smartphone transmits the input one or more gateway IDs to the device management server 20 (S115). The device information setting unit 21 of the device management server 20 stores these gateway IDs in the device information storing unit 26 in association with the subject device ID. It is to be noted that the gateway ID may be mere identification information or may be information indicating the configuration of software installed on the gateway 10.

Next, when coupling information (service set identifier (SSID), password, or the like) of the device 40 is input to the device setting screen by the user (S116), the smartphone transmits the input coupling information to the device management server 20 (S117). The device information setting unit 21 of the device management server 20 stores this coupling information in the device information storing unit 26 in association with the subject device ID.

Subsequently, when a whitelist of the device 40 is input to the device setting screen by the user (S118), the smartphone transmits the input whitelist to the device management server 20 (S119). The device information setting unit 21 of the device management server 20 stores this whitelist in the device information storing unit 26 in association with the subject device ID.

Figure 6:
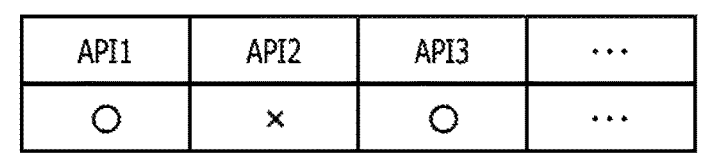

FIG. 6 illustrates a configuration example of the whitelist. As illustrated in FIG. 6, the whitelist is information indicating whether or not access is permitted (circle or cross in FIG. 6) regarding each API (for example, method that may be called through a network) of the device 40.

Subsequently, when application information of the device 40 is input to the device setting screen by the user (S120), the smartphone transmits the input application information to the device management server 20 (S121). The device information setting unit 21 of the device management server 20 stores this application information in the device information storing unit 26 in association with the subject device ID. It is to be noted that the application information is identification information of an application (program) that is to be activated in the gateway 10 when the device 40 cooperates with another device 40 or information indicating a URL from which this application may be downloaded or the like. For example, when the device 40 is an earphone microphone, the application information of an application relating to a voice call may be set. It is to be noted that, as for the device 40 with which activation of an application is unnecessary, the application information does not have to be set.

The processing procedure of FIG. 5 is executed regarding each device 40 desired to cooperate with another device 40.

Figure 7:
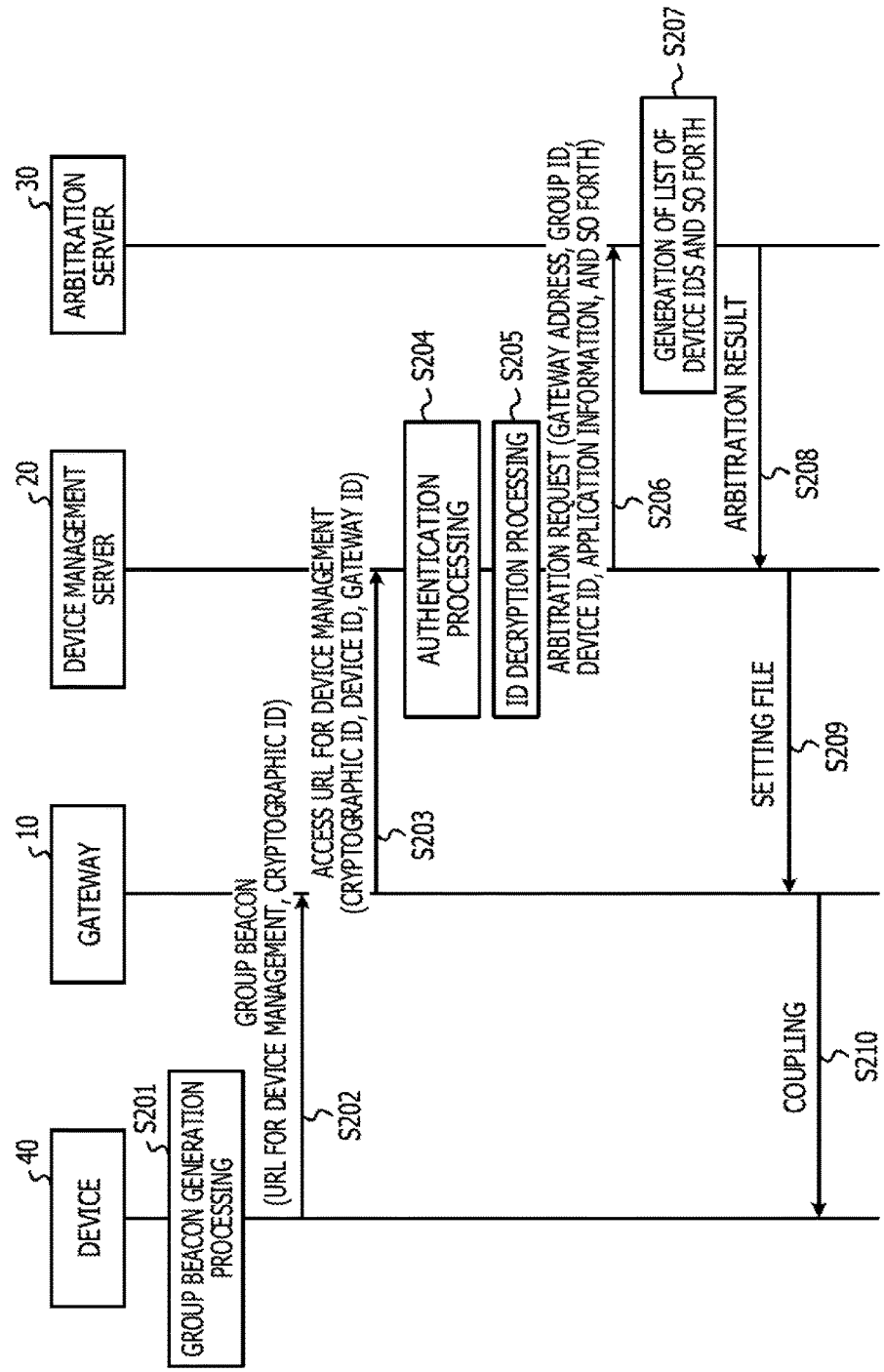
FIG. 7 is a sequence diagram for explaining an outline of an overall processing procedure at a time of cooperation between devices.

Next, a processing procedure executed when cooperation between the devices 40 is executed will be described. FIG. 7 is a sequence diagram for explaining an outline of an overall processing procedure at the time of cooperation between the devices.

When given operation is executed by a user to two or more devices 40 deemed as cooperation targets, these devices 40 execute group beacon generation processing (S201). The given operation is operation of almost simultaneously pressing a given button of each of the devices 40 of the cooperation targets or making a near field communication (NFC) touch among the devices 40 of the cooperation targets, for example. Hereinafter, this operation will be referred to as "grouping operation." Furthermore, the group beacon generation processing refers to processing in which one group ID is decided among the devices 40 of the cooperation targets and a beacon (hereinafter, referred to as "group beacon") including data (hereinafter, referred to as "cryptographic ID") obtained by encrypting this group ID, a monotonic value, and so forth by a common key and a URL for device management is generated. It is to be noted that when the grouping operation is executed, the devices 40 of the cooperation targets exist in a range in which the devices 40 may directly communicate with each other. This is because a group ID common among these respective devices 40 is decided by the direct communications among the respective devices 40 of the cooperation targets.

Subsequently, each of the devices 40 of the cooperation targets transmits the group beacon generated by a respective one of the devices 40 (S202). It is to be noted that the common group ID is included in the group beacon transmitted by each device 40 of the cooperation target.

When detecting the group beacon transmitted from the certain device 40, the gateway 10 extracts the URL for device management, the cryptographic ID, and a device ID from this group beacon. The gateway 10 transmits a message including these cryptographic ID and device ID and the gateway ID of this gateway 10 to the extracted URL for device management (S203). The authentication unit 22 of the device management server 20 corresponding to this URL for device management executes authentication processing relating to this gateway ID (S204). For example, the authentication succeeds if this gateway ID is stored in the device information storing unit 26 in association with this device ID. Otherwise, the authentication fails. If the authentication fails, the subsequent processing is ceased.

If the authentication succeeds, the decryption unit 23 of the device management server 20 decrypts the cryptographic ID by a common key stored in the device information storing unit 26 in association with this device ID (S205). As a result, the group ID and so forth of a plaintext are obtained. Subsequently, the arbitration request unit 24 of the device management server 20 transmits an arbitration request including these group ID and device ID, application information stored in the device information storing unit 26 in association with this device ID, and so forth to a URL for arbitration stored in the device information storing unit 26 in association with this device ID (S206). It is to be noted that the steps S201 to S206 are executed regarding each of the devices 40 of the cooperation targets. Therefore, the arbitration server 30 receives the arbitration request regarding each device 40 of the cooperation target at almost the same time. However, the arbitration requests relating to the respective devices 40 of the cooperation targets are not necessarily received from the common device management server 20. This is because there is the case in which the URLs for device management set in the respective devices 40 of the cooperation targets are different.

Subsequently, the arbitration unit 31 of the arbitration server 30 executes generation of a list of device IDs included in arbitration requests with a common group ID in the history of the received arbitration requests, and so forth (S207). At this time, arbitration is also executed about the pieces of application information included in the respective arbitration requests with the common group ID. For example, the pieces of application information registered in the device management server 20 regarding the respective devices 40 deemed as the cooperation targets are not necessarily the same. On the other hand, the number of applications activated for one group in the gateway 10 is one. Therefore, the arbitration unit 31 selects one piece of application information among the pieces of application information included in the arbitration requests with the common group ID.

Subsequently, for example, the arbitration unit 31 transmits an arbitration result including the list of device IDs, the selected application information, and so forth to the device management server 20 of the transmission source of the arbitration request (S208).

When this arbitration result is received, the setting file generating unit 25 of the device management server 20 generates a setting file including the list of device IDs and the application information that are included in this arbitration result, the device ID received in the step S203, a whitelist and coupling information stored in the device information storing unit 26 in association with this device ID, and the group ID decrypted in the step S205. The setting file generating unit 25 transmits the generated setting file to the gateway 10 of the transmission source of the message relating to the step S203 (S209).

When the setting file is received, the coupling setting unit 12 of the gateway 10 stores the information included in this setting file in the gateway 10. Subsequently, the relay unit 13 of the gateway 10 makes coupling to the device 40 of the transmission source of the group beacon in the step S202 based on the coupling information included in this setting file (S210).

Figure 1:
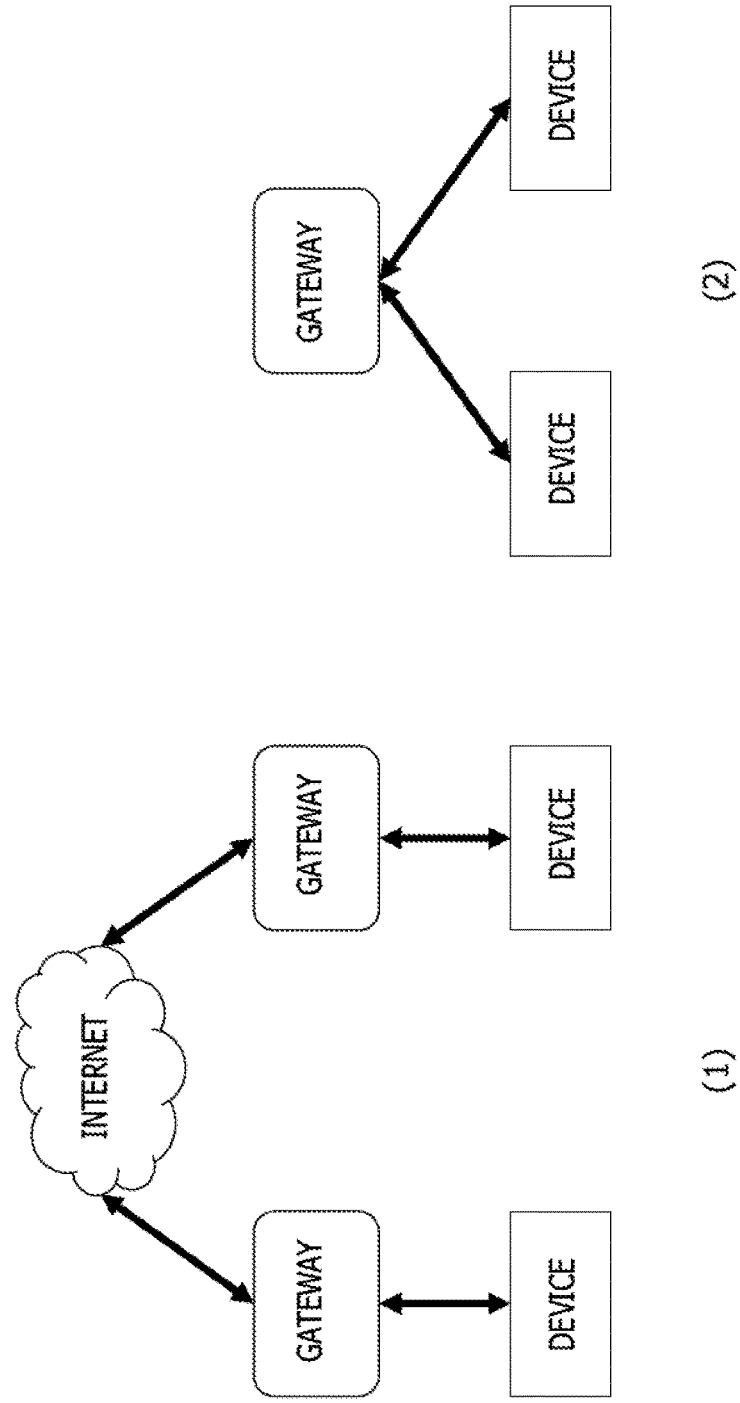
FIG. 1 illustrates an example of coupling between devices with an intermediary of a gateway.

The steps S201 to S210 are executed for each of the devices 40 of the cooperation targets. Therefore, the coupling form illustrated in (1) or (2) of FIG. 1 is implemented. The relay unit 13 limits communications among the devices 40 to communications among the devices 40 with a common group ID in the state in which the relay unit 13 is coupled to the device 40. Furthermore, regarding the API of the certain device 40, the relay unit 13 limits access from other devices 40 based on the whitelist corresponding to this certain device 40.

Figure 8A:
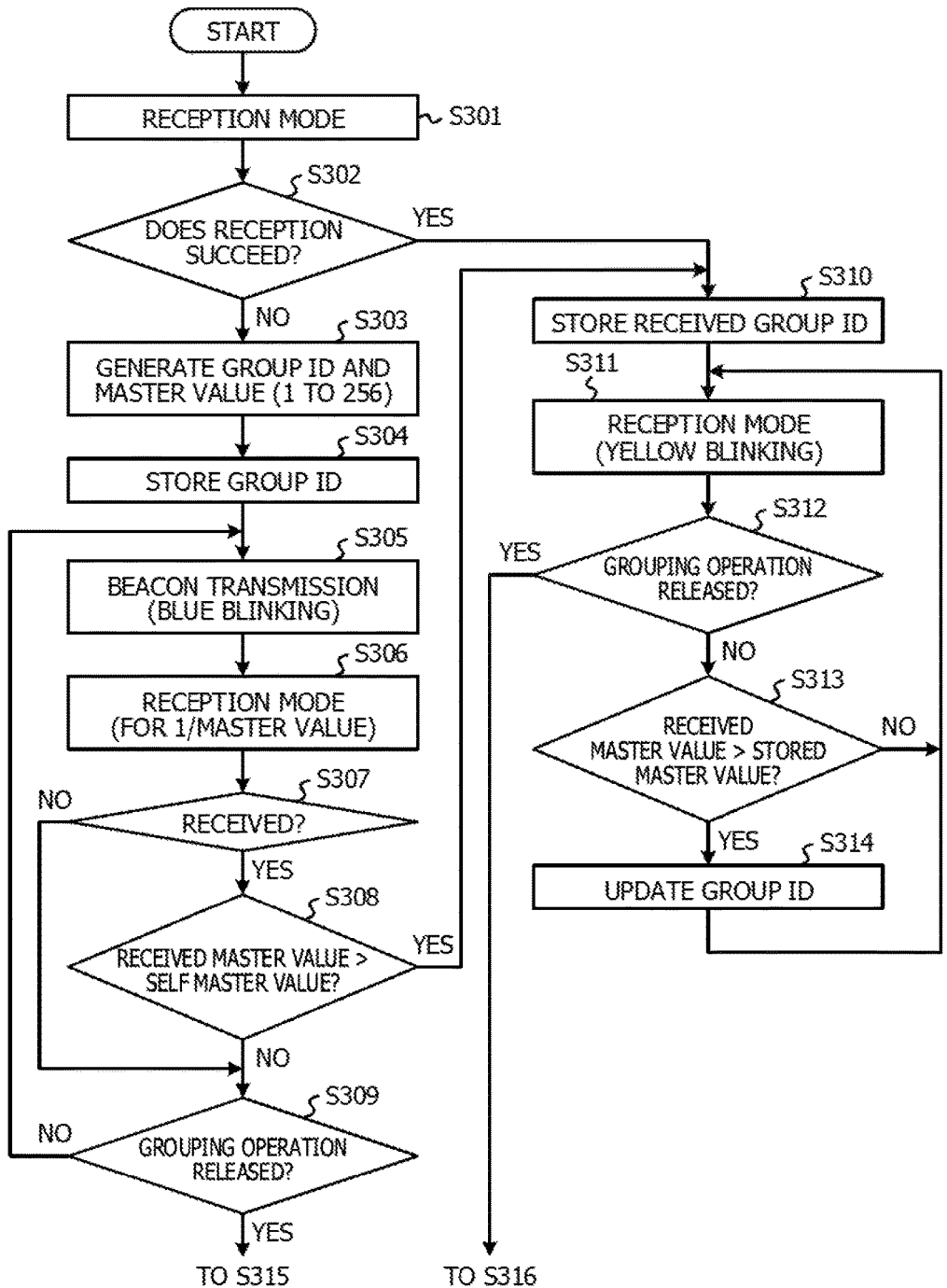
FIGS. 8A and 8B are flowcharts for explaining one example of a processing procedure of group beacon generation processing by devices.
Figure 8B:
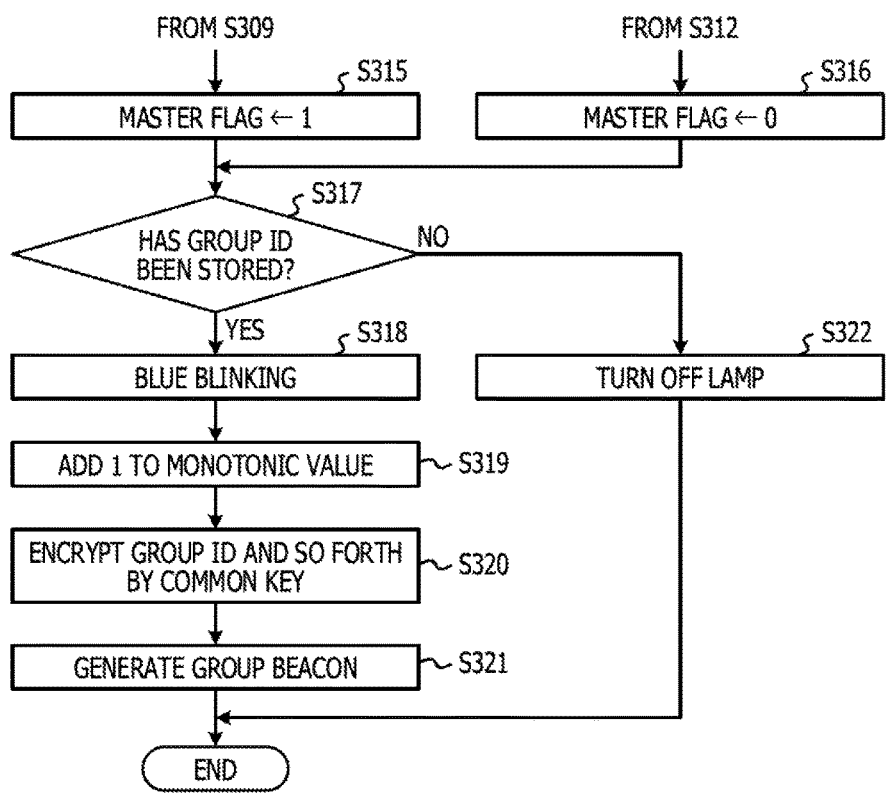

Next, details of the step S201 will be described. FIGS. 8A and 8B are flowcharts for explaining one example of a processing procedure of the group beacon generation processing by the devices.

When grouping operation by a user is detected, first the ID deciding unit 41 of the device 40 attempts to receive a candidate beacon from another device 40 (S301). The candidate beacon refers to a beacon including a candidate for the group ID and is distinguished from the group beacon transmitted after decision of the group ID.

If a candidate beacon is received (Yes in S302), the processing proceeds to a step S310. If a candidate beacon is not received (No in S302), the ID deciding unit 41 randomly generates a candidate for the group ID and a master value (S303). The master value is an integer of at least 1 and at most 256, for example. Subsequently, the ID deciding unit 41 stores the generated candidate for the group ID in the ID storing unit 45 (S304). Next, the ID deciding unit 41 transmits a candidate beacon (S305). In the candidate beacon, the candidate for the group ID and the master value generated in the step S303 are included. At this time, the ID deciding unit 41 causes a given lamp of the device 40 to blink in blue. For example, the blue blinking represents that a candidate beacon is being transmitted.

Subsequently, the ID deciding unit 41 waits for reception of a candidate beacon from another device 40 for seconds equivalent to (1/master value), for example (S306). Because the waiting time is the reciprocal of the master value, the waiting time is shorter in the device 40 whose master value is larger. If a candidate beacon from another device 40 is not received (No in S307), the processing proceeds to a step S309. If a candidate beacon from another device 40 is received (Yes in S307), the ID deciding unit 41 compares the master value included in the received candidate beacon (hereinafter, referred to as "received master value") and the own master value generated in the step S303 (hereinafter, referred to as "self master value" (S308). If the self master value is equal to or larger than the received master value (No in S308), the step S305 and the subsequent steps are executed until the grouping operation (pressing-down of a button or the like) is released (S309). For example, the device 40 that has started transmission of the candidate beacon once continues this transmission of the candidate beacon until the grouping operation is released unless a candidate beacon including a master value larger than the self master value is received.

On the other hand, if the received master value is larger than the self master value (Yes in S308), the processing proceeds to the step S310.

In the step S310, the ID deciding unit 41 stores the candidate for the group ID included in the received candidate beacon in the ID storing unit 45. If a candidate for the group ID has been already stored in the ID storing unit 45, the already-stored candidate for the group ID is overwritten by the received candidate for the group ID. Subsequently, the ID deciding unit 41 waits for reception of a candidate beacon from another device 40 for a given time (S311). At this time, the ID deciding unit 41 causes the given lamp of the device 40 to blink in yellow. For example, the yellow blinking represents that the self-device is not transmitting a candidate beacon but waiting for reception of a candidate beacon from another device 40.

If a grouping operation is released (Yes in S312), the processing proceeds to a step S316. If a grouping operation is not released (No in S312), the ID deciding unit 41 compares the received master value and the master value stored in the ID storing unit 45 (hereinafter, referred to as "stored master value") (S313). If the received master value is larger than the stored master value (Yes in S313), the ID deciding unit 41 overwrites the candidate for the group ID stored in the ID storing unit 45 by the candidate for the group ID included in the received candidate beacon (S314).

If the device 40 blinks in blue, the step S305 and the subsequent steps are repeated until the grouping operation is released. Furthermore, if the device 40 blinks in yellow, the step S311 and the subsequent steps are repeated until the grouping operation is released.

The user releases the grouping operation (for example, releases pressing-down of a button) when any one device 40 blinks in blue and all of the other devices 40 blink in yellow through execution of the steps S301 to S314 by the two or more devices 40 deemed as the targets of the grouping operation (Yes in S309). Such a state is the state in which the device 40 that is blinking in blue is the master and the devices 40 that are blinking in yellow store the candidate for the group ID generated by the device 40 of the master.

If the grouping operation is released in the state in which the device 40 is blinking in blue (Yes in S309), the ID deciding unit 41 substitutes 1 into a master flag (S315). The master flag is data indicating whether or not the relevant device 40 is the master. The master refers to the device 40 that has generated the group ID candidate employed as the group ID. On the other hand, if the grouping operation is released in the state in which the device 40 is blinking in yellow (Yes in S312), the ID deciding unit 41 substitutes 0 into the master flag (S316).

Subsequently to the step S315 or S316, the encryption unit 42 determines whether or not the group ID has been stored in the ID storing unit 45 (S317). If the group ID has been stored in the ID storing unit 45 (Yes in S317), the encryption unit 42 causes the given lamp of the device 40 to blink in blue (S318). Subsequently, the encryption unit 42 adds 1 to the monotonic value stored in the device 40 in the step S111 in FIG. 5 (S319). Next, the encryption unit 42 encrypts the group ID, the monotonic value, the master flag, and so forth by using the common key stored in the device 40 in the step S111 in FIG. 5 and generates a cryptographic ID (S320).

Subsequently, the beacon generating unit 43 generates a group beacon including the URL for device management stored in the device 40 and the cryptographic ID (S321).

Figure 9:
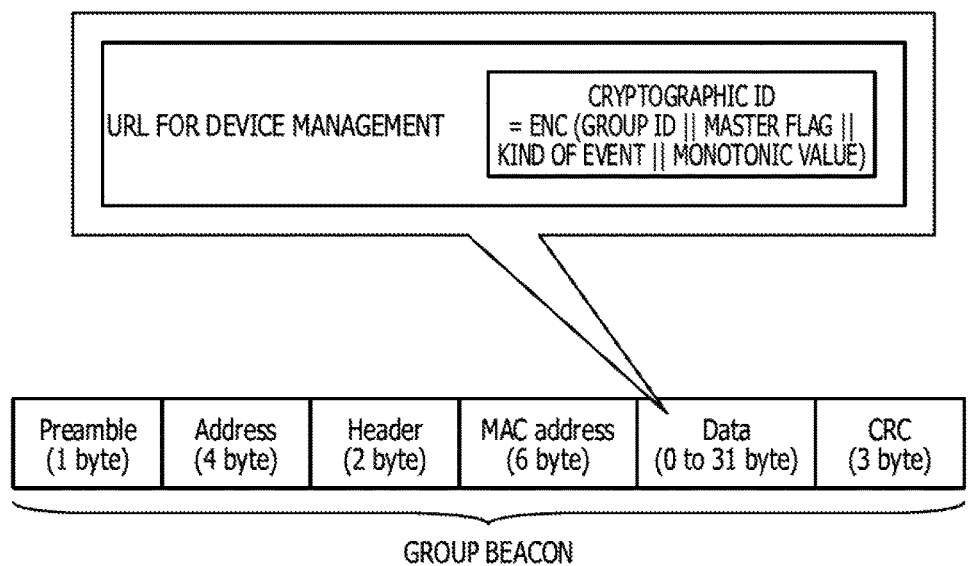
FIG. 9 illustrates a configuration example of a group beacon.

FIG. 9 illustrates a configuration example of the group beacon. As illustrated in FIG. 9, the URL for device management and the cryptographic ID are included in a data part (Data) of the group beacon. It is to be noted that, in FIG. 9, an example in which the kind of event is included in the cryptographic ID besides the group ID, the monotonic value, and the master flag is represented. The kind of event is information indicating the kind of grouping operation (for example, pressing-down of a button, NFC touch, or the like) executed for grouping of the devices 40.

Furthermore, in FIG. 9, a rectangle representing the cryptographic ID is included in a rectangle representing the URL for device management. This represents that the cryptographic ID is specified as an argument of the URL for device management. It is to be noted that, in the group beacon, the device ID (MAC address) of the device 40 and so forth are also included similarly to a general beacon.

The group beacon that is generated in the step S321 and has a configuration like that illustrated in FIG. 9 is transmitted in the step S202 in FIG. 7.

Figure 10:
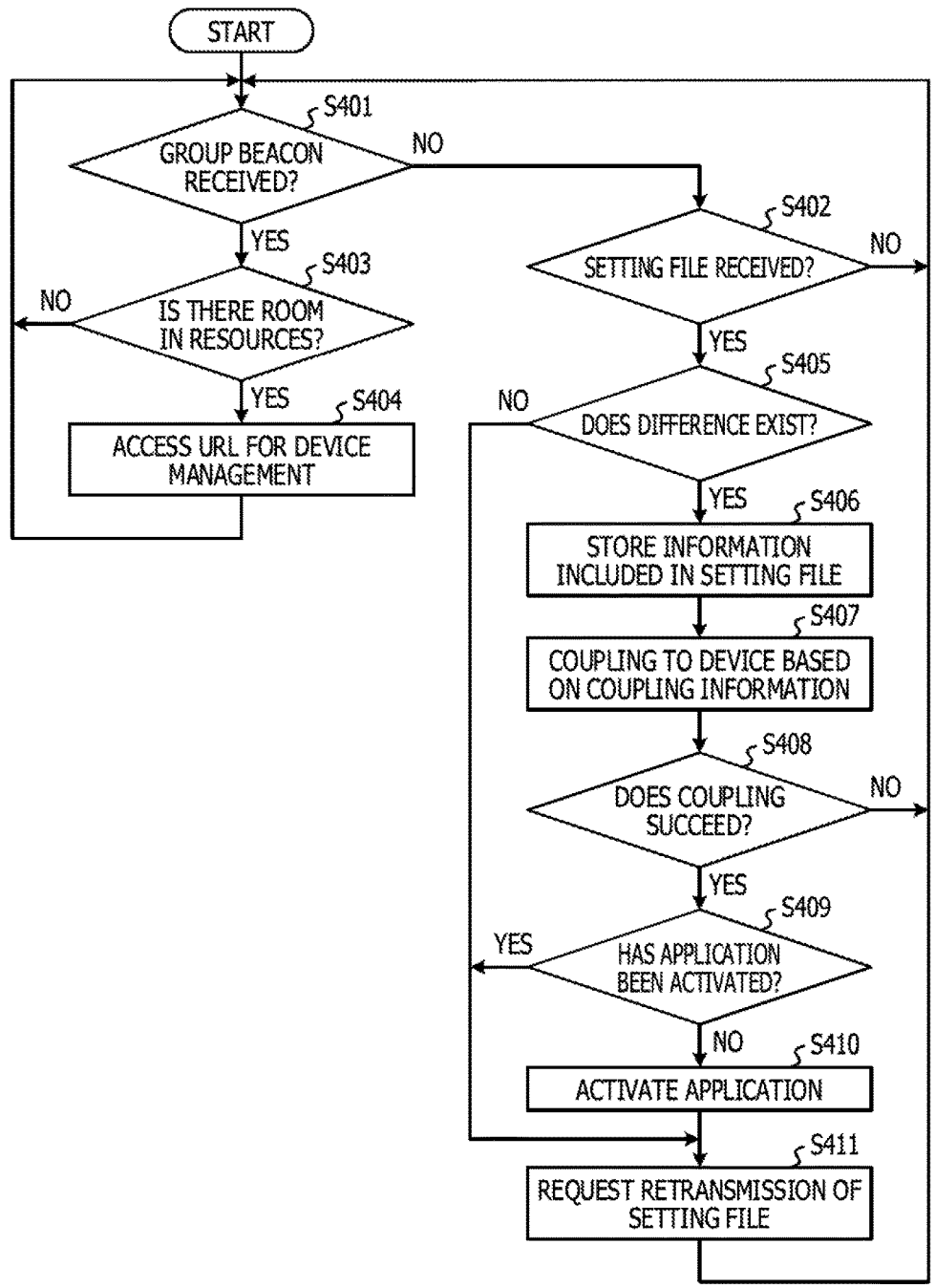
FIG. 10 is a flowchart for explaining one example of a processing procedure executed by a gateway in response to detection of a group beacon.

Next, a processing procedure executed by the gateway 10 will be described. FIG. 10 is a flowchart for explaining one example of the processing procedure executed by the gateway in response to detection of the group beacon. For example, FIG. 10 is a diagram for explaining the processing procedure executed by the gateway 10 in FIG. 7 in detail.

The device finding unit 11 waits for reception of a group beacon (S401). Meanwhile, the coupling setting unit 12 waits for reception of a setting file from the device management server 20 (S402). If a group beacon transmitted by a certain device 40 that has not been found (hereinafter, referred to as "subject device 40") is received (Yes in S401), the device finding unit 11 determines whether or not there is room in the communication resources (S403). For example, whether or not the gateway 10 itself may be coupled to the device 40 is determined. If there is no room in the communication resources (No in S403), the processing returns to the step S401.

If there is room in the communication resources (Yes in S403), the device finding unit 11 transmits a message indicating that the device 40 is found (hereinafter, referred to as "device finding message") to the URL for device management included in the data part of this group beacon (S404). It is to be noted that if the same group beacon as the group beacon for which the step S404 has been already executed is received, the step S404 and the subsequent steps do not have to be executed.

It is to be noted that a cryptographic ID is added to an argument of this URL for device management. Therefore, in the step S404, the cryptographic ID is transmitted to the device management server 20 corresponding to this URL for device management. Furthermore, in the device finding message, the gateway ID of this gateway 10 and the device ID of the subject device 40 are included. The device ID of the subject device 40 is extracted from the group beacon.

Meanwhile, if a setting file and a session ID are received as a response to the device finding message transmitted in the step S404 (Yes in S402), the coupling setting unit 12 determines whether or not a difference exists from the setting file previously received, regarding the setting file newly received (S405). Here, the setting file previously received refers to the (N−1)-th received setting file if the setting file newly received is the N-th received setting file. It is to be noted that if the setting file received in the step S402 is the setting file received first after the reception of the group beacon of the subject device 40 (for example, in the case of N=1), it is determined that a difference exists.

If the setting file is received first or if the setting file newly received is different from the setting file previously received (Yes in S405), the coupling setting unit 12 stores (overwrites) the information included in the received setting file in the gateway 10 (S406). For example, a whitelist included in the setting file is stored in the whitelist storing unit 15. The whitelist is included in the setting file for each of device IDs relating to a list of device IDs included in the setting file. Furthermore, the list of device IDs included in the setting file is stored in the group information storing unit 14 in association with a group ID included in the setting file.

FIG. 11 illustrates a configuration example of the group information storing unit. As illustrated in FIG. 11, in the group information storing unit 14, device IDs corresponding to the relevant group ID are stored regarding each group ID. It is to be noted that, in FIG. 11, "XXX APPLICATION" is the name of an application activated in the gateway 10 regarding the relevant group ID. For example, "XXX APPLICATION" is the name of an application indicated by application information included in the received setting file. Also regarding this application, communications with the devices 40 corresponding to the relevant group ID are permitted. Therefore, the name of this application is associated with this group ID.

Furthermore, in FIG. 11, a device ID of "<IP ADDRESS>: 33:44:55:66:77" is the device ID of the device 40 coupled to another gateway 10 indicated by <IP ADDRESS> (IP is an abbreviation for internet protocol). For example, if a coupling form like that illustrated in (1) of FIG. 1 is employed, the device ID of the device 40 coupled to another gateway 10 is included in the list of device IDs.

It is to be noted that if, in the step S406, a list of device IDs has been already associated with the group ID included in the setting file and stored in the group information storing unit 14, the list of device IDs associated with this group ID is updated by the list of device IDs included in this setting file. For example, every time a setting file different from the previous setting file is received, the device IDs associated with the relevant group ID are updated.

It is to be noted that the session ID is identification information assigned to the device finding message of each device 40. Therefore, even with device finding messages from the same gateway 10, the session ID included in a response to the device finding message relating to a device 40A is different from the session ID included in a response to the device finding message relating to a device 40B.

Subsequently, the relay unit 13 makes coupling to the subject device 40 based on coupling information (SSID, password, and so forth) included in this setting file (S407).

If the coupling succeeds (Yes in S408), the relay unit 13 determines whether or not an application relating to application information included in the setting file has been activated (S409). If this application has not been activated (No in S409), the relay unit 13 activates this application (S410). It is to be noted that if originally this application is not installed on the gateway 10, the coupling setting unit 12 executes installation of this application. At this time, this application may be downloaded from a URL or the like indicated by the application information.

Subsequently, the relay unit 13 transmits a message to request retransmission of a setting file (hereinafter, referred to as "retransmission request message") to the device management server 20 of the transmission source of the setting file (S411). In the retransmission request message, for example, the session ID received in the step S402, the group ID included in the setting file received in the step S402, and the device ID of the device 40 newly coupled are included.

It is to be noted that the retransmission request message is transmitted in order to receive a setting file updated according to coupling of another device 40 to another gateway 10 in the case in which two or more gateways 10 are used as in the form of (1) of FIG. 1. A setting file returned in response to the retransmission request message is received in the step S402. In this case, if a difference does not exist between the setting file newly received and the setting file previously received, the steps S406 to S410 are not executed and the retransmission request message is transmitted again. For example, the gateway 10 repeatedly receives the setting file.

Figure 12:
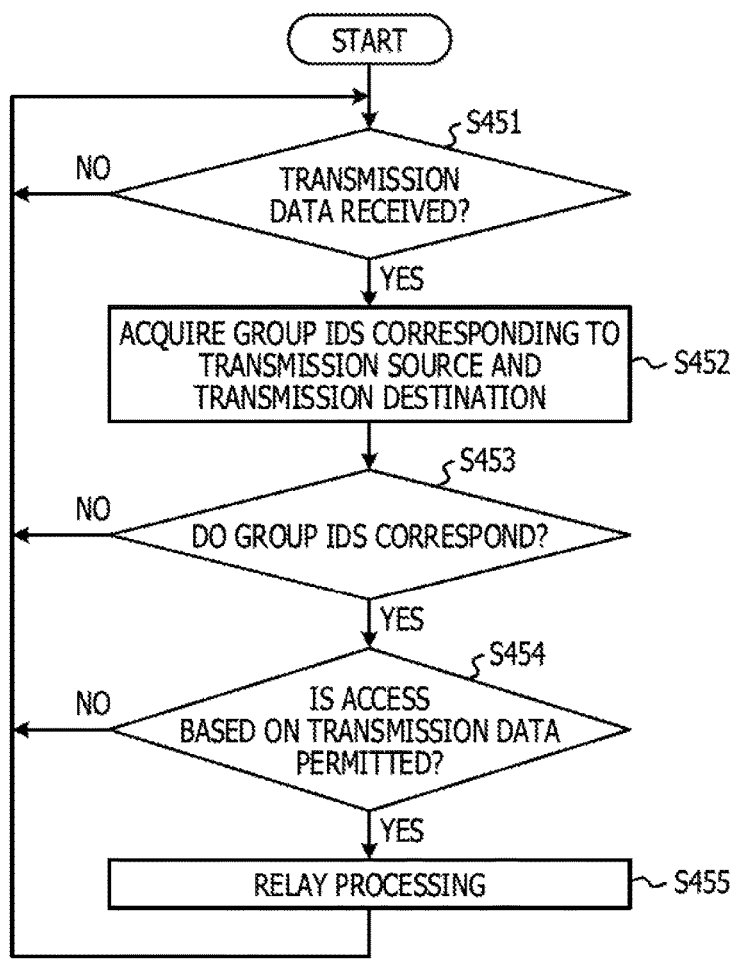
FIG. 12 is a flowchart for explaining one example of a processing procedure executed by a gateway in response to reception of data from a device to which the gateway is coupled.

FIG. 12 is a flowchart for explaining one example of a processing procedure executed by the gateway in response to reception of data from the device to which the gateway is coupled. The processing procedure of FIG. 12 is executed after the respective devices 40 that belong to the same group are coupled to the gateway 10 by the processing procedure of FIG. 10.

If transmission data to another device 40 is received from any device 40 coupled to the gateway 10 or another gateway 10 (Yes in S451), the relay unit 13 acquires the group ID associated with the device ID of the transmission source of this transmission data and the group ID associated with the device ID of the transmission destination from the group information storing unit 14 (S452). It is to be noted that the device ID of the transmission source and the device ID of the transmission destination are included in the transmission data. Furthermore, as for transmission data from another gateway 10, the IP address of this another gateway 10 is also included.

Subsequently, the relay unit 13 determines whether or not the respective group IDs corresponding to the transmission source and the transmission destination correspond with each other (S453). If the respective group IDs corresponding to the transmission source and the transmission destination correspond with each other (Yes in S453), the relay unit 13 determines whether or not access to the API to which access is requested in this transmission data is permitted in a whitelist stored in the whitelist storing unit 15 in association with the device ID of the device 40 of the transmission destination (S454). If this access is permitted (Yes in S454), the relay unit 13 executes relay processing (routing processing) about this transmission data (S455). For example, this transmission data is transmitted to the device 40 of the transmission destination.

On the other hand, the relay unit 13 does not execute the relay processing if the respective group IDs corresponding to the transmission source and the transmission destination do not correspond with each other (No in S453) or if the access requested in the transmission data is not permitted (No in S454). For example, in this case, the access from the device 40 of the transmission source to the device 40 of the transmission destination is limited.

Figure 13:
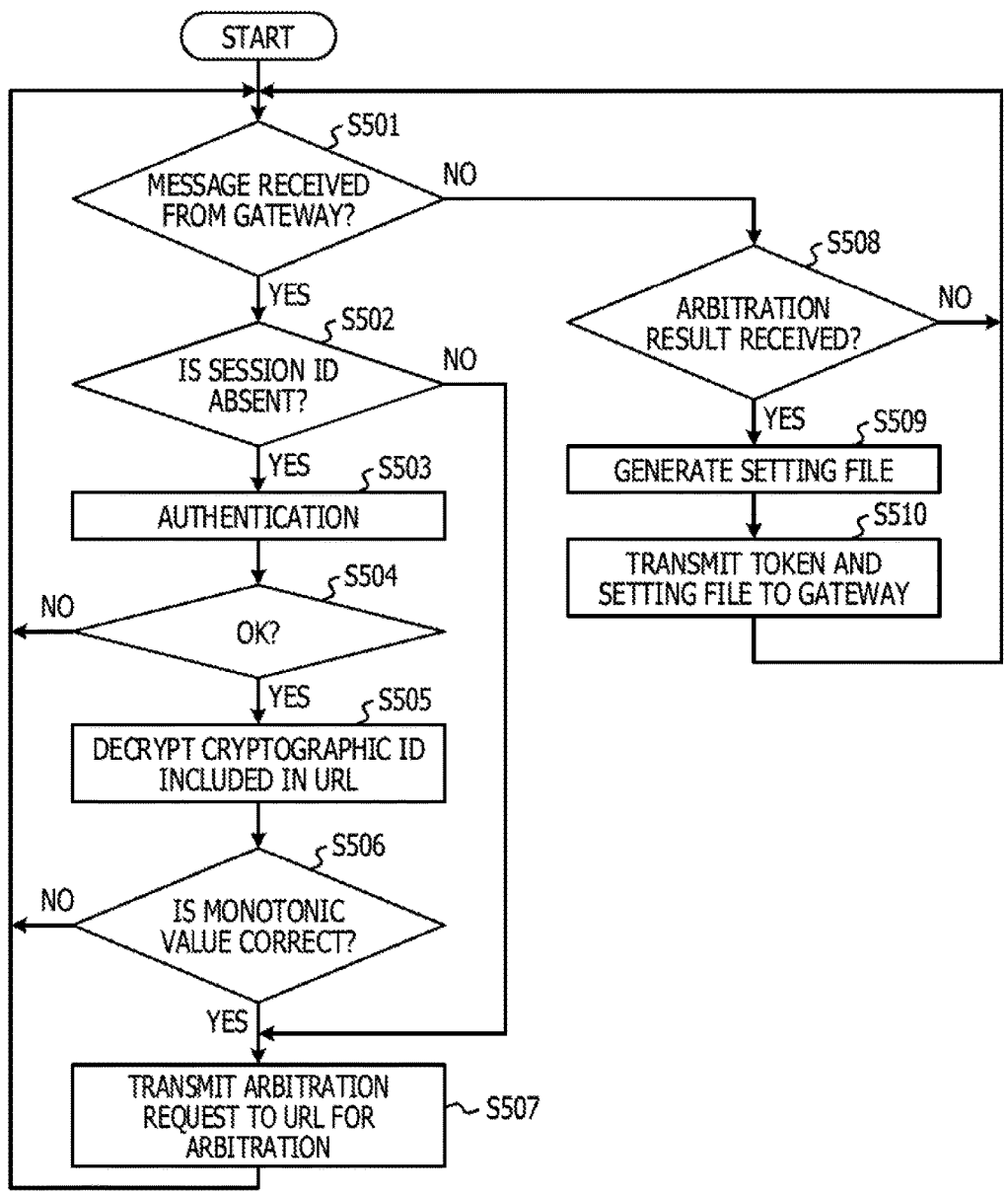
FIG. 13 is a flowchart for explaining one example of a processing procedure executed by a device management server.

Next, a processing procedure executed by the device management server 20 will be described. FIG. 13 is a flowchart for explaining one example of the processing procedure executed by the device management server. FIG. 13 is a diagram for explaining the processing procedure executed by the device management server 20 in FIG. 7 in detail.

The authentication unit 22 of the device management server 20 waits for reception of a message (device finding message or retransmission request message) from any gateway 10 (S501). Furthermore, the arbitration request unit 24 waits for reception of an arbitration result from the arbitration server 30 (S508).

If a message from a certain gateway 10 (hereinafter, referred to as "subject gateway 10") is received (Yes in S501), the authentication unit 22 determines whether or not a session ID is included in this message (S502). If a session ID is not included in this message (Yes in S502), this message is a device finding message to the URL for device management. Therefore, the authentication unit 22 executes authentication processing about the subject gateway 10 based on a gateway ID included in this device finding message (S503). For example, the authentication succeeds if this gateway ID is stored in the device information storing unit 26 in association with the relevant device ID. Otherwise, the authentication fails. If the authentication succeeds (Yes in S504), a step S505 and subsequent steps are executed.

In the step S505, the decryption unit 23 decrypts a cryptographic ID included as an argument of the URL for device management in the device finding message by a common key stored in the device information storing unit 26 in association with a device ID included in the device finding message (hereinafter, referred to as "subject device ID"). As a result, a plaintext of each of a group ID, the master flag, the kind of event, and a monotonic value is acquired.

Subsequently, the decryption unit 23 determines whether or not the decrypted monotonic value is correct (S506). For example, it is determined that the decrypted monotonic value is correct if the decrypted monotonic value is larger than the monotonic value stored in the device information storing unit 26 in association with the subject device ID. If the decrypted monotonic value is equal to or smaller than the monotonic value stored in the device information storing unit 26 in association with the subject device ID, it is determined that the decrypted monotonic value is incorrect.

If the decrypted monotonic value is correct (Yes in S506), the arbitration request unit 24 transmits an arbitration request including the decrypted group ID, the decrypted master flag, application information stored in the device information storing unit 26 in association with the subject device ID, the subject device ID, and the IP address of the subject gateway 10 to the URL for arbitration stored in the device information storing unit 26 in association with the subject device ID (S507). Subsequently, the processing returns to the step S501.

On the other hand, if a session ID is included in the message from the gateway 10 received in the step S501 (No in S502), this message is a retransmission request message. Therefore, in this case, the steps S503 to S506 are not executed and the step S507 is executed. At this time, in the arbitration request transmitted in the step S507, a group ID and a device ID included in the retransmission request message and the IP address of the gateway 10 of the transmission source of the retransmission request message are included.

Furthermore, if an arbitration result for the arbitration request transmitted in the step S507 is received from the arbitration server 30 (Yes in S508), the setting file generating unit 25 generates a setting file (S509). For example, the setting file including application information and a list of device IDs that are indicated by this arbitration result, whitelists and pieces of coupling information stored in the device information storing unit 26 in association with the respective devices 40 relating to this list, the subject device ID, and the decrypted group ID is generated. It is to be noted that, in the step S509, the setting file generating unit 25 also generates a session ID corresponding to the device 40 relating to the subject device ID.

Subsequently, the setting file generating unit 25 transmits the generated setting file and session ID to the subject gateway 10 (S510).

Figure 14:
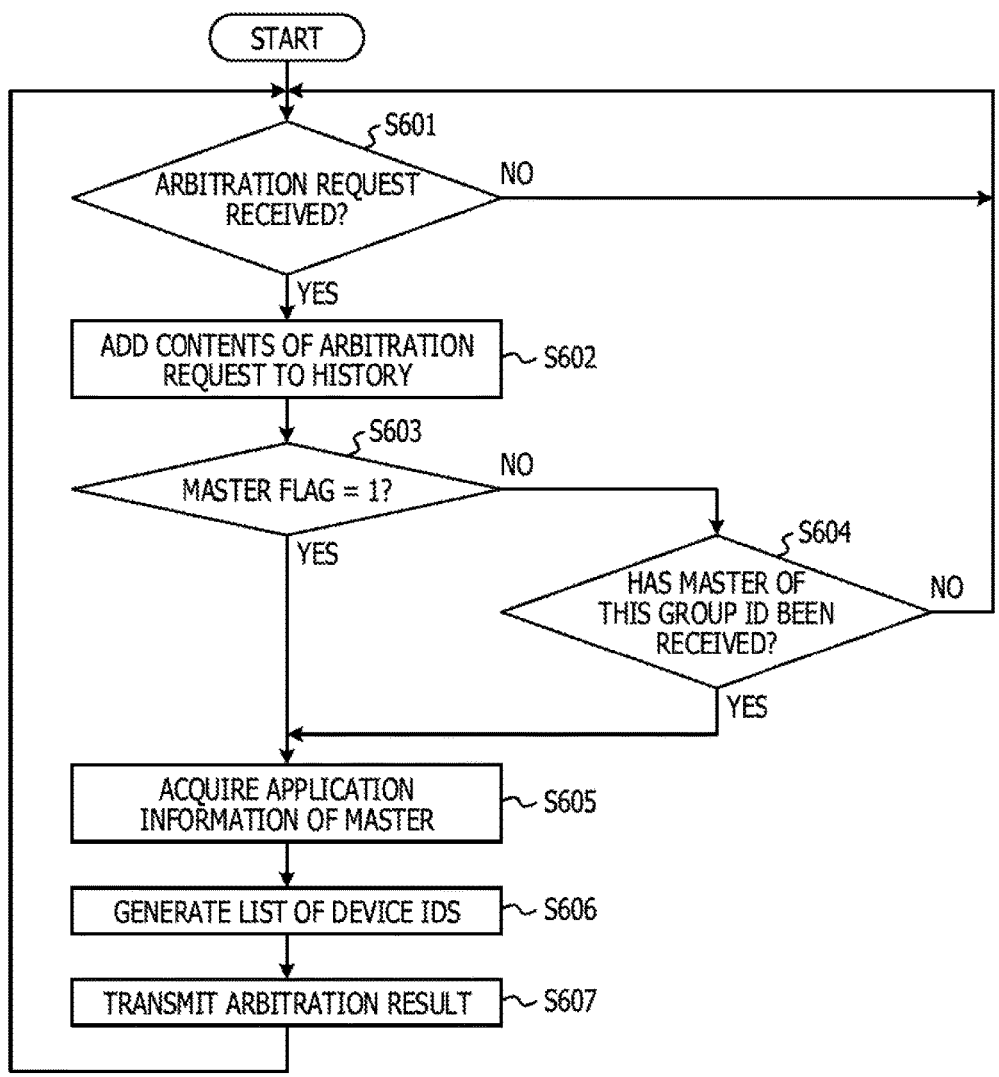
FIG. 14 is a flowchart for explaining one example of a processing procedure executed by an arbitration server.

Next, a processing procedure executed by the arbitration server 30 will be described. FIG. 14 is a flowchart for explaining one example of the processing procedure executed by the arbitration server. FIG. 14 is a diagram for explaining the processing procedure executed by the arbitration server 30 in FIG. 7 in detail.

If an arbitration request transmitted from any device management server 20 (hereinafter, referred to as "subject device management server 20") is received (Yes in S601), the arbitration unit 31 stores information included in this arbitration request (hereinafter, referred to as "subject arbitration request") in the history storing unit 32 (S602).

FIG. 15 illustrates a configuration example of the history storing unit. As illustrated in FIG. 15, regarding each arbitration request received thus far, the history storing unit 32 stores a group ID included in the arbitration request, the IP address of the gateway 10, a device ID, the master flag, and so forth.

In the step S602, a record including a group ID included in the subject arbitration request (hereinafter, referred to as "subject group ID"), the IP address of the gateway 10, a device ID, the master flag, and so forth is added to the history storing unit 32.

Subsequently, the arbitration unit 31 determines whether or not the value of the master flag included in the subject arbitration request is 1 (S603). If this master flag is 0 (No in S603), the arbitration unit 31 determines, regarding the subject group ID, whether or not the arbitration request in which the master flag is 1 has been received with reference to the history storing unit 32 (S604). If the relevant arbitration request has not been received (No in S604), the processing returns to the step S601. Therefore, in this case, an arbitration result is not returned to the subject device management server 20.

If the relevant master flag is 1 (Yes in S603) or if the arbitration request in which the master flag is 1 has been received regarding the subject group ID (Yes in S604), the arbitration unit 31 acquires application information of the record in which the master flag is 1 from the history storing unit 32 regarding the subject group ID (S605). For example, the application information corresponding to the device 40 of the master among the devices 40 that belong to the group relating to the subject group ID is selected. However, the application information may be selected by another method. For example, the most common application information in the records including the subject group ID in the history storing unit 32 may be selected.

Subsequently, the arbitration unit 31 generates a list of device IDs of the respective records including the group ID of the subject device 40 (S606). At this time, to the device ID of a record including an IP address different from the IP address of the gateway 10 included in the subject arbitration request, the IP address of this record is added.

Next, the arbitration unit 31 transmits an arbitration result including the application information acquired in the step S605 and the list of device IDs generated in the step S606 to the subject device management server 20 (S607).

Figure 16:
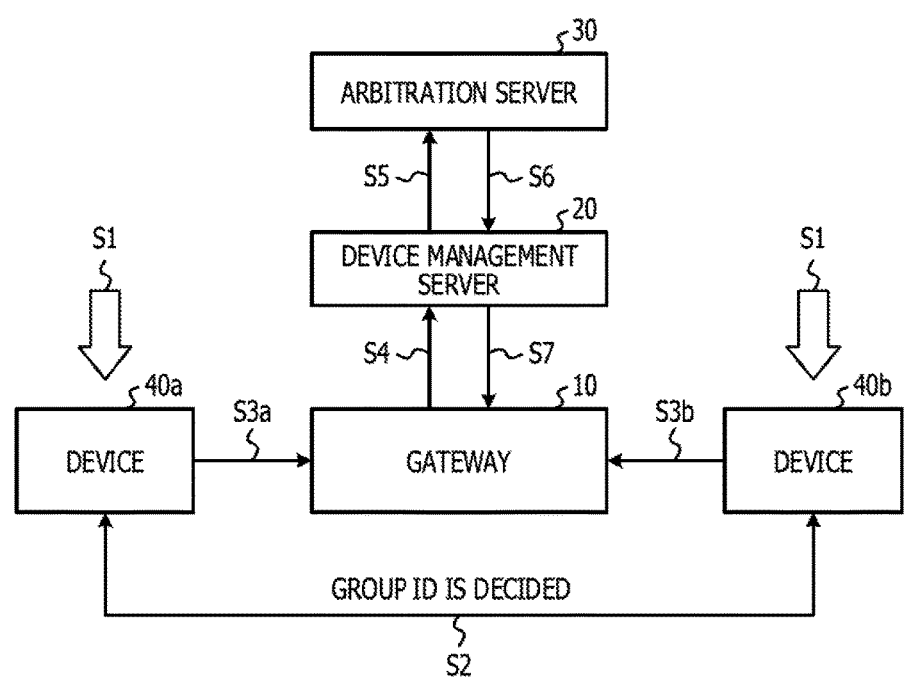
FIG. 16 is a diagram for explaining a processing procedure in a first configuration example.

A description will be made with applying of the processing procedures described above to configuration examples. FIG. 16 is a diagram for explaining a processing procedure in a first configuration example. FIG. 16 corresponds to (2) of FIG. 1.

When a button of each of a device 40a and a device 40b is pressed down by a user as grouping operation (S1), the processing procedure of FIGS. 8A and 8B is executed and a group ID is decided in the device 40a and the device 40b (S2). Each of the device 40a and the device 40b transmits a group beacon including this group ID (S3a and S3b). Every time the gateway 10 receives a respective one of the group beacon from the device 40a and the group beacon from the device 40b, the gateway 10 accesses a URL for device management included in the group beacon (S4). The device management server 20 transmits an arbitration request to the arbitration server 30 in response to this access (S5). When the arbitration request corresponding to the device 40 of the master is received, the arbitration server 30 selects application information and generates a list of device IDs. The arbitration server 30 transmits an arbitration result including this application information and this list of device IDs to the device management server 20 (S6). The device management server 20 generates a setting file including this arbitration result and transmits this setting file to the gateway 10 (S7). Based on this setting file, the gateway 10 makes coupling to the respective devices 40 and relays communications between the devices 40.

Figure 17:
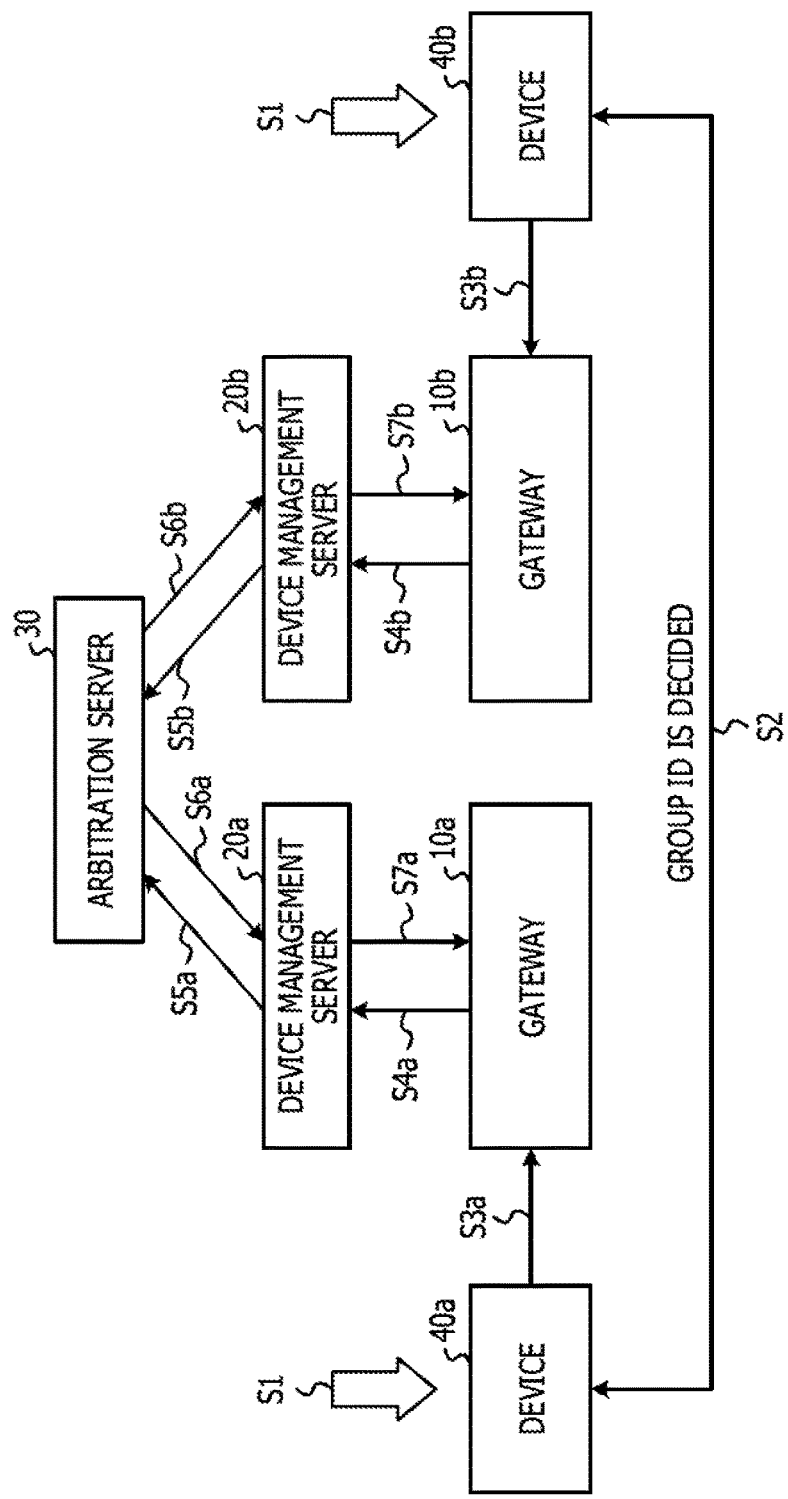
FIG. 17 is a diagram for explaining a processing procedure in a second configuration example.

FIG. 17 is a diagram for explaining a processing procedure in a second configuration example. The same step as FIG. 16 is given the same step number in FIG. 17 and description thereof is omitted. FIG. 17 corresponds to (1) of FIG. 1.

Suppose that the device 40a and the device 40b belong to the same group and a common group ID is assigned to the devices 40a and 40b (S1 and S2).

When receiving a group beacon from the device 40a (S3a), a gateway 10a accesses a device management server 20a corresponding to the device 40a (S4a). The device management server 20a transmits an arbitration request to the arbitration server 30 (S5a). Meanwhile, when receiving a group beacon from the device 40*b* (S3*b*), a gateway 10*b* accesses a device management server 20*b* corresponding to the device 40*b* (S4*b*). The device management server 20*b* transmits an arbitration request to the arbitration server 30 (S5*b*).

When the arbitration request corresponding to the device 40 of the master is received, the arbitration server 30 selects application information and generates a list of device IDs. For example, if the device 40*a* is the master, the arbitration server 30 selects application information and generates a list of device IDs in response to reception of the arbitration request from the device management server 20*a* (S5*a*). At this time, if the arbitration request from the device management server 20*b* has not been received, only the device ID of the device 40*a* is included in this list. Therefore, in this case, the arbitration server 30 transmits the list including only the device ID of the device 40*a* and the application information to the device management server 20*a* (S6*a*). The device management server 20*a* generates a setting file including this arbitration result and transmits this setting file to the gateway 10*a* (S7*a*). The gateway 10*a* makes coupling to the device 40*a* based on this setting file.

Thereafter, when receiving the arbitration request from the device management server 20*b* (S5*b*), the arbitration server 30 selects the application information that has been already selected and generates a list of device IDs including the device ID of the device 40*a* and the device ID of the device 40*b*. The arbitration server 30 transmits an arbitration result including this application information and this list of device IDs to the device management server 20*b* (S6*b*). The device management server 20*b* generates a setting file including this arbitration result and transmits this setting file to the gateway 10*b* (S7*b*). The gateway 10*b* makes coupling to the device 40*b* based on this setting file. Furthermore, based on the list of device IDs included in this setting file, the gateway 10*b* relays transmission data from the device 40*a* received via the gateway 10*a* to the device 40*b* and relays transmission data from the device 40*b* to the device 40*a* to the gateway 10*a*.

Meanwhile, the gateway 10*a* repeatedly transmits a retransmission request message to the device management server 20*a* after the coupling to the device 40*a* (S4*a*). The device management server 20*a* repeatedly transmits an arbitration request to the arbitration server 30 in response to the retransmission request message repeatedly transmitted (S5*a*). In the process of the repetition of the arbitration request, as an arbitration result for the arbitration request from the device management server 20*a* after reception of the arbitration request from the device management server 20*b*, a list including the device IDs of both of the device 40*a* and the device 40*b* is returned to the device management server 20*a* (S6*a*). The device management server 20*a* generates a setting file including this arbitration result and transmits this setting file to the gateway 10*a* (S7*a*). Based on this setting file, the gateway 10*a* comes to relay transmission data from the device 40*b* received via the gateway 10*b* to the device 40*a* and relay transmission data from the device 40*a* to the device 40*b* to the gateway 10*b* based on the list of device IDs included in this setting file.

It is to be noted that if the arbitration server 30 provides services in a wide range (for example, all over Japan or all over the world) like cloud services, there is also a possibility that group IDs accidentally correspond with each other between devices 40 having no relation to each other. To avoid such a situation, in the step S404 in FIG. 10, the gateway 10 may transmit, to the device management server 20, both or either one of position information obtained by positioning by a global positioning system (GPS) function of the gateway 10 and time information indicated by a clock of the gateway 10. The device management server 20 may make this position information and this time information be included in an arbitration request and transmit the arbitration request to the arbitration server 30. The arbitration server 30 may identify a group by utilizing at least either one of the position information and the time information as well as a group ID. For example, the devices 40 about which the group IDs are the same and difference of the position information and the time information is within a given range may be determined to belong to the same group.

Furthermore, selected application information may be changed depending on grouping operation (kind of event). In this case, in S120 and S121 in FIG. 5, application information is registered in the device management server 20 for each kind of event regarding the subject device 40. The device management server 20 may make application information corresponding to the kind of event included in a cryptographic ID decrypted in the step S505 in FIG. 13 be included in an arbitration request and transmit the arbitration request to the arbitration server 30.

As described above, according to the present embodiment, the user executes grouping operation for devices 40 desired to be permitted to mutually communicate and thereby may set communications in these devices 40 possible. For example, communications from another device 40 to these devices 40 are limited. Therefore, setting work for limiting the devices 40 capable of mutual communications is simplified.

It is to be noted that sensors may be applied as the devices 40 in the present embodiment. For example, a user executes grouping operation in advance about sensors whose measurement values are desired to be uploaded to the same server. As a result, each sensor included in these sensors transmits a group beacon including the same group ID. When receiving the group beacon from the sensor, one or plural gateways 10 acquire a setting file corresponding to the group relating to this group beacon from the device management server 20. Here, if application information of an application to execute processing of uploading a measurement value of the relevant sensor is included in this setting file, the gateway 10 comes to upload a measurement value from the coupled sensor to a given server. Even when plural gateways 10 are used, the same application is selected regarding sensors relating to a common group ID. Therefore, each gateway 10 comes to transmit measurement values obtained by the respective sensors to a common server.

Furthermore, the present embodiment may be applied to management of the device 40 in a company or the like. Here, a description will be made by employing a projector as the device 40 of the management target. Moreover, in this example, a smartphone individually possessed by an employee of the company is equivalent to the gateway 10. By the processing of FIG. 5, a smartphone that may access each device 40 is registered in the device management server 20. As a result, when a certain employee attempts to couple an own smartphone to the projector possessed by the company, this smartphone executes the processing procedure of FIG. 10. Therefore, this smartphone accesses the relevant device management server 20 in the step S404. In response to this access, the device management server 20 executes authentication about this smartphone in the step S503 in FIG. 13. Therefore, the authentication succeeds only when this smartphone is registered as a smartphone that may be coupled to this projector in advance. If the authentication succeeds, a setting file corresponding to the projector is transmitted to this smartphone and the smartphone may communicate with this projector. On the other hand, if the authentication fails, this smartphone does not communicate with this projector. In this manner, the access to the device 40 possessed by the company may be limited.

It is to be noted that, in the present embodiment, the gateway 10, the device management server 20, and the arbitration server 30 are one example of an information processing system. The gateway 10 is one example of information processing apparatus or first information processing apparatus. The device management server 20 and the arbitration server 30 are one example of second information processing apparatus. The device finding unit 11 is one example of a receiving unit and a first transmitting unit. The setting file generating unit 25 is one example of a second transmitting unit. The group ID is one example of first identification information. The device ID is one example of second identification information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
   a first information processing apparatus in one or more first information processing apparatuses configured to relay communication between equipment, the first information processing apparatus including a communication device and first processor; and
   a second information processing apparatus coupled to the one or more first information processing apparatuses through a network, the second information processing apparatus including a communication device and second processor,
   wherein
   the first processor of the first processing apparatus is configured to:
      receive a beacon from one or more equipment for which given operation is executed by a user among a plurality of equipment, the beacon including first identification information whose value is common to the plurality of equipment, each of the plurality of equipment being configured to transmit the beacon,
      transmit the first identification information and second identification information identifying the one or more equipment, included in the received beacon, to the second information processing apparatus, and
      execute processing of relaying communication between equipment relating to a list of the second identification information and access information transmitted from the second information processing apparatus, and
   the second processor of the second processing apparatus is configured to: transmit, to one of one or more first information processing apparatuses or a plurality of first information processing apparatus in the one or more first information processing apparatuses, the list of the second identification information received in relation to first identification information with a common value in a plurality of the first identification information received from the one of one or more first information processing apparatuses or the plurality of the first identification information received from the plurality of first information processing apparatuses, and the access information that is stored in association with each of the second identification information included in the list, the access information indicating whether access is permitted regarding each interface of the equipment.

2. The system according to claim 1, wherein
   the second processor of the second processing apparatus is configured to transmit, to the first information processing apparatus, program information that is stored in association with each of the second identification information included in the list, the program information relating to a program, and
   the first processor of the first processing apparatus is configured to activate the program based on the program information.

3. An information processing apparatus in one or more information processing apparatuses configured to relay communication between equipment, the information processing apparatus comprising:
   a communication device; and
   a processor coupled to the communication device and configured to:
      receive a beacon from one or more equipment for which given operation is executed by a user among a plurality of equipment, the beacon including first identification information whose value is common to the plurality of equipment, each of the plurality of equipment being configured to transmit the beacon,
      transmit the first identification information and second identification information identifying the one or more equipment, included in the received beacon, to another information processing apparatus coupled to the one or more information processing apparatuses through a network, and
      execute processing of relaying communication between equipment relating to a list of the second identification information and access information transmitted from the other information processing apparatus,
   wherein the other information processing apparatus is configured to transmit, to one of one or more information processing apparatuses or a plurality of information processing apparatus in the one or more information processing apparatuses, the list of the second identification information received in relation to first identification information with a common value in a plurality of the first identification information received from the one of one or more information processing apparatuses or the plurality of the first identification information received from the plurality of information processing apparatuses, and the access information that is stored in association with each of the second identification information included in the list, the access information indicating whether access is permitted regarding each interface of the equipment.

4. The information processing apparatus according to claim 3, wherein
   the other information processing apparatus is configured to transmit, to the information processing apparatus, program information that is stored in association with each of the second identification information included in the list, the program information relating to a program, and the processor is configured to activate the program based on the program information.

5. A non-transitory storage medium storing a program that causes an information processing apparatus in one or more information processing apparatuses configured to relay communication between equipment to execute a process, the process comprising:
receiving a beacon from one or more equipment for which given operation is executed by a user among a plurality of equipment, the beacon including first identification information whose value is common to the plurality of equipment, each of the plurality of equipment being configured to transmit the beacon;
transmitting the first identification information and second identification information identifying the one or more equipment, included in the received beacon, to another information processing apparatus coupled to the one or more information processing apparatuses through a network; and
executing processing of relaying communication between equipment relating to a list of the second identification information and access information transmitted from the other information processing apparatus,
wherein the other information processing apparatus is configured to transmit, to one of one or more information processing apparatuses or a plurality of information processing apparatus in the one or more information processing apparatuses, the list of the second identification information received in relation to first identification information with a common value in a plurality of the first identification information received from the one of one or more information processing apparatuses or the plurality of the first identification information received from the plurality of information processing apparatuses, and the access information that is stored in association with each of the second identification information included in the list, the access information indicating whether access is permitted regarding each interface of the equipment.

6. The storage medium according to claim 5, wherein
the other information processing apparatus is configured to transmit, to the information processing apparatus, program information that is stored in association with each of the second identification information included in the list, the program information relating to a program, and
the process further comprises: activating the program based on the program information.

* * * * *